(12) United States Patent
Vijaywargiya et al.

(10) Patent No.: US 7,156,449 B2
(45) Date of Patent: Jan. 2, 2007

(54) LOAD-BEARING MOUNTING REINFORCEMENT STRUCTURE FOR VEHICLES

(75) Inventors: Sandeep Vijaywargiya, Troy, MI (US); Joseph V Rozenbaum, Ortonville, MI (US); John A Radomski, Inkster, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 154 days.

(21) Appl. No.: 10/922,461

(22) Filed: Aug. 20, 2004

(65) Prior Publication Data

US 2006/0038421 A1 Feb. 23, 2006

(51) Int. Cl.
*B60J 5/00* (2006.01)
(52) U.S. Cl. .................. 296/146.6; 359/871; 248/475.1
(58) Field of Classification Search .................. 296/29, 296/146.5, 146.6, 146.1; 359/871; 248/466, 248/475.1
See application file for complete search history.

(56) References Cited

U.S. PATENT DOCUMENTS

| | | | | |
|---|---|---|---|---|
| 4,422,724 A | * | 12/1983 | Otsuka et al. | 359/875 |
| 4,790,590 A | * | 12/1988 | Ito et al. | 296/146.1 |
| 5,294,084 A | * | 3/1994 | Syamoto et al. | 248/544 |
| 5,746,471 A | * | 5/1998 | Teramoto et al. | 296/146.1 |

* cited by examiner

*Primary Examiner*—Joseph D. Pape
(74) *Attorney, Agent, or Firm*—Ralph E. Smith

(57) ABSTRACT

A load-bearing reinforcement structure for assisting the secure mounting of a load producing element, such as a rear-view mirror assembly, to a vehicular body is advantageously fashioned from a heat and creep resistant plastic, such as glass-reinforced Polyethylene Terephthalate. The reinforcement structure features a mounting element capable of mechanically connecting the reinforcement structure to a surface of a vehicular body, such as an internal surface of a panel of a door assembly, without the need for welding, placement fixtures or use of separate fastening elements.

16 Claims, 4 Drawing Sheets

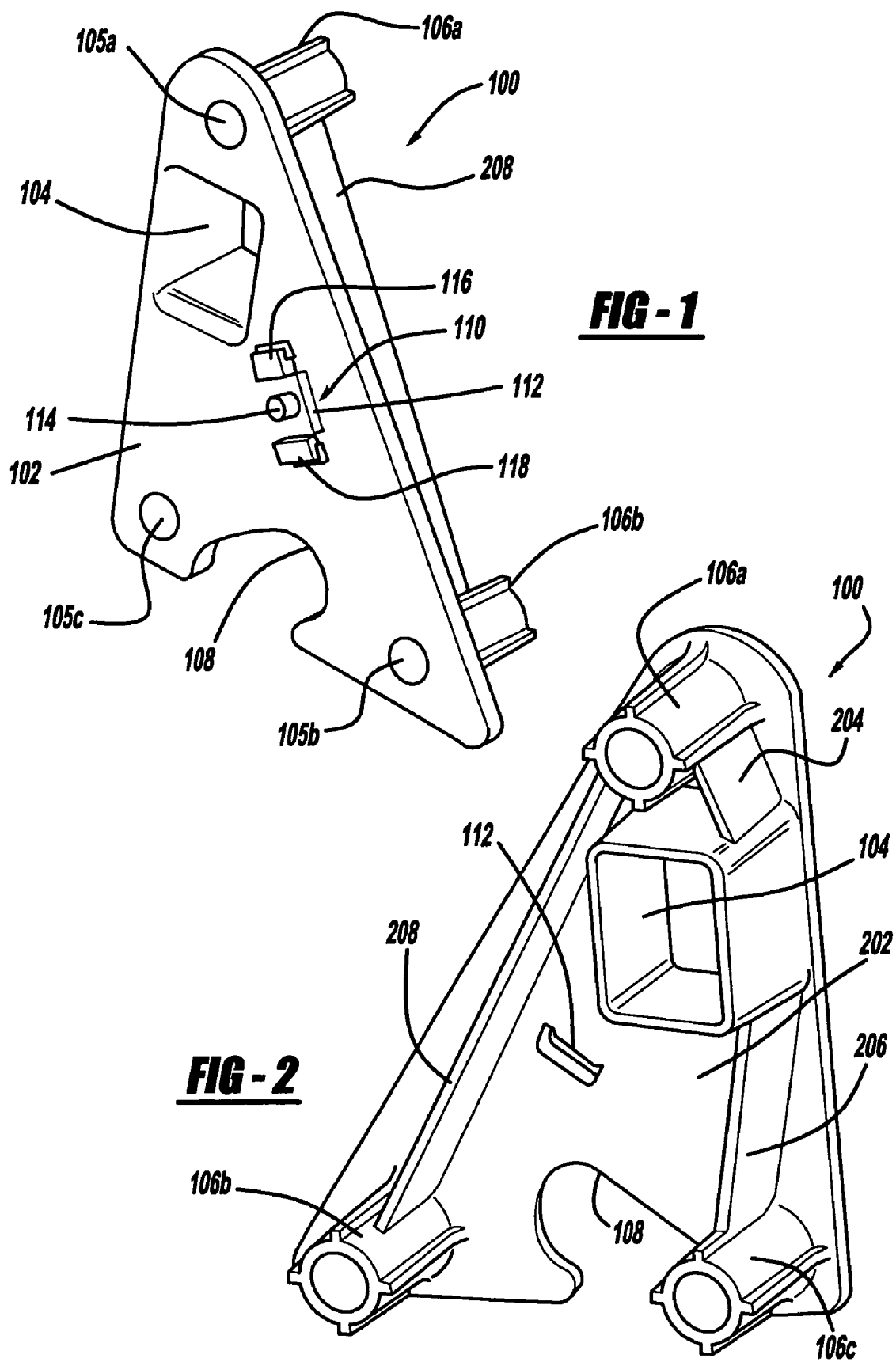

LOAD-BEARING MOUNTING REINFORCEMENT STRUCTURE FOR VEHICLES

BACKGROUND OF THE INVENTION

The invention relates generally to reinforcing structures for mounting of load-bearing items. More specifically, the invention concerns mounting reinforcement structures for motor vehicle accessories, such as rear-view mirrors, to be attached to an outer surface of a door of the vehicle.

Currently available mounting reinforcement structures for accessories such as rear-view mirrors for vehicles suffer many drawbacks. Such current products are fashioned from steel and require welding processes to be attached to the door subassembly with attendant tool, labor and maintenance costs. Additionally, such current reinforcing structures do not have self-locating features, therefore requiring locating tools in order to be properly assembled between the inner and outer panels of a vehicle door. Also, currently available reinforcing structures require a retainer to hold the part in place until assembled in the full door assembly.

Stamped steel mirror reinforcement structures currently lack the necessary rigidity to meet systems performance requirements without incurring the cost of increasing the thickness of either the door sheet metal or that of the mirror housing. Additionally, such steel reinforcements are not corrosion resistant.

SUMMARY OF THE INVENTION

A load-bearing reinforcement structure for assisting mounting of a load-producing element to a vehicular body includes a support body having a surface adapted to abut a surface of the vehicular body and a mounting element capable of mechanically connecting the support body to the surface of the vehicular body without a need for welding or use of separate fastening elements, wherein the structure is fashioned from a plastic material.

In another aspect of the invention, a load-bearing reinforcement structure for a vehicular door includes a plate-like element having a first face adapted to at least partially abut an inner surface of one of the vehicle door's inner and outer panels. A plurality of hollow tubular members extend from the plate-like element for a distance substantially equal to a distance between the inner and outer panels of the vehicle door, and a locating and attachment assembly is adapted to attachingly engage one of the vehicle door's inner and outer panels in a preselected orientation with respect thereto.

In yet another aspect of the invention, a vehicle includes a door assembly having inner and outer door panels separated by an interior gap and an injection molded plastic reinforcement structure for the door assembly which includes a plate-like element having a first face at least partially engaging an inner surface of the outer door panel. A plurality of hollow tubular members extend from the plate-like element across the gap to a corresponding plurality of openings in the inner door panel, and a locating and attaching assembly is associated with the first face attachingly engages the outer door panel in a preselected orientation with respect thereto. A hollow conduit extends from the first face across the gap to an inside surface of the inner door panel and in communication with substantially mating openings in the outer and inner door panels. Finally, a loading element is coupled to an outer surface of the outer door panel by a plurality of studs, each extending from the loading element through the outer door panels, through one of the plurality of hollow tubular members, and then through a corresponding opening in the inner door panel.

BRIEF DESCRIPTION OF THE DRAWINGS

The objects and features of the invention will become apparent from a reading of a detailed description, taken in conjunction with the drawing, in which:

FIG. 1 is a perspective view of an outwardly-facing side of a reinforcement structure arranged in accordance with the principles of the invention;

FIG. 2 is a perspective view of an opposite, vehicle interior-facing side surface of the reinforcement structure of FIG. 1;

DETAILED DESCRIPTION

Figure 3A:
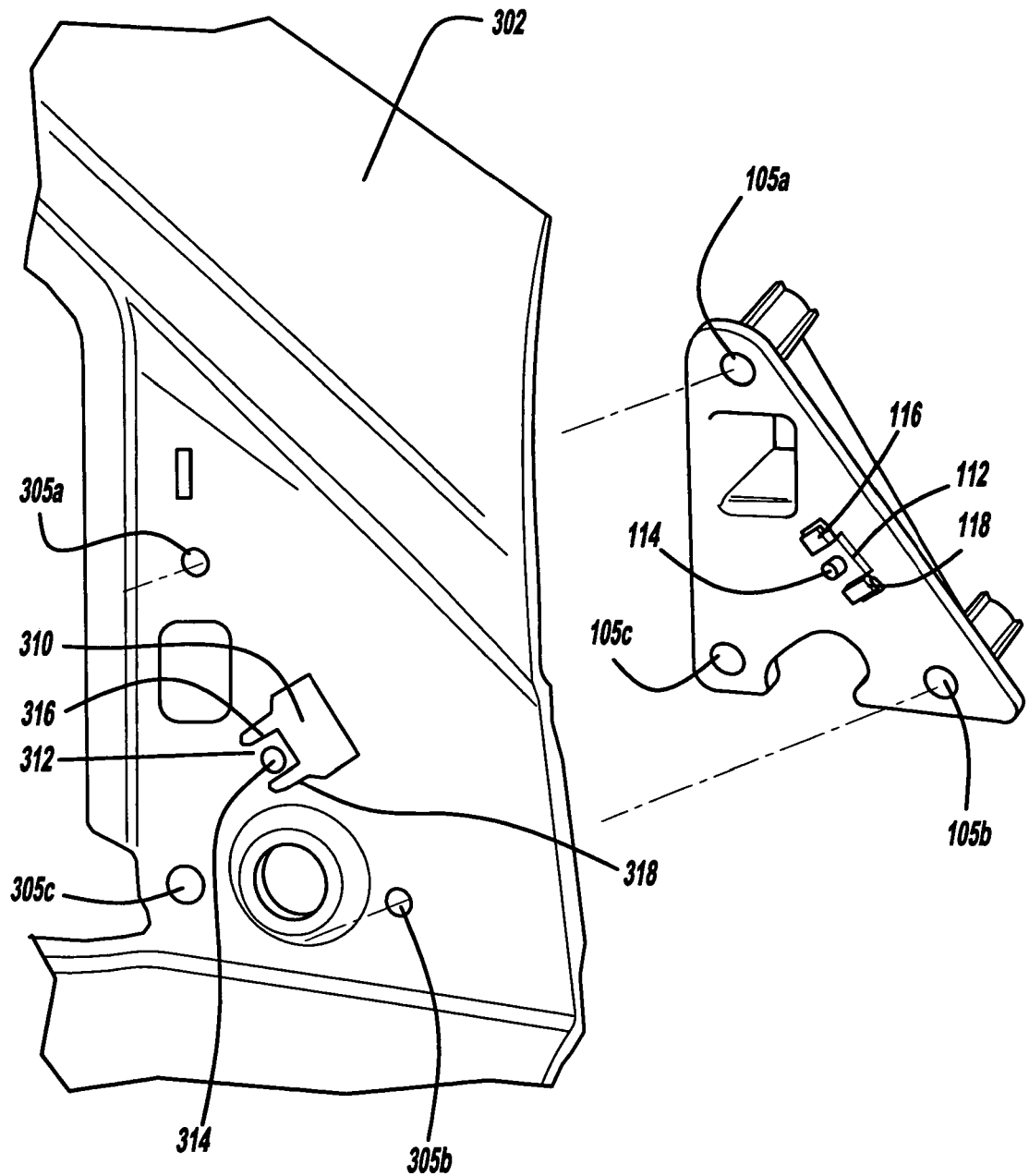
FIGS. 3A–3C present perspective views of a door outer panel receiving the reinforcement structure of the invention.

One aspect of this invention is the application of a suitable plastic such as Polyethylene Terephthalate (PET) for structural load-bearing components in vehicle mounting systems, such as for mounting a rear-view mirror at the front area of a vehicle door assembly. PET is an environmentally friendly material with multiple benefits enjoyed over steel. First, the weight of the PET is about one fifth of that of steel and yet has an equal energy absorbing capacity. Other benefits of PET over steel are that it is noncorrosive and has a better damping characteristic, which leads to less vibration.

The mechanical properties of PET are excellent when body components are subject to high temperature, stress and cyclic conditions for long periods of time. PET is a stiffened, super tough thermoplastic polyester and has the highest combined stiffness/toughness of any thermoplastic. In addition, it offers outstanding appearance, high and low temperature performance, good electrical properties and dimensional stability. All these characteristics meet the requirements of the invention for a material having a high melting point—on the order of 350–375° F.—capable of withstanding typical temperatures encountered in paint application and baking chambers in the automotive industry. Additionally, the material is capable of withstanding at least 100 inch-pounds of torque from mirror mounting nuts. The material also exhibits high creep resistance to prevent loosening over the lifetime of the vehicle in multi-temperature environments.

For the purposes of this invention, the preferred PET material is glass reinforced, more particularly, 35–40% mica/glass reinforced. Examples of PET's suitable for this invention are Rynite® 935 and Rynite® 940 commercially available from E. I. DuPont de Nemours and Company.

With reference to FIGS. 1 and 2, mirror mounting reinforcement structure 100 is fashioned from Rynite® 935 in an injection molding process and features a flat carrier plate surface 102 which substantially matches the surface of the inner facing surface of a door outer panel to provide anti-rattle effect to the door outer panel. Wiring bundle or harness passage 104 is a substantially rectangular conduit extending from inwardly facing surface 202 of the structure for a distance substantially equal to the gap between the inner and outer door assembly panels.

Three mounting stud-receiving tubes 106a, b, c likewise span the distance between the door inner and outer panels.

Tubes 106a, 106b and 106c act as structural columns when a clamp load, such as the rear-view mirror assembly, is applied to the door system.

A locating feature, slot 108, is cut out of the plate-like structure 100 and engages a member spanning the inner and outer door panels such that the structure 100 will be positioned properly without the use of external positioning tools. Slot 108 is used in conjunction with a locating and installing assembly 110 which includes a flexible tab 112 bearing a locating protrusion 114 on its surface. Raised tangs 116 and 118 are used along with the flexible tab 112 in a manner to be described below for properly mechanically attaching element 100 to an inner surface of the outer door panel and for properly locating it in conjunction with element 108.

Mounting studs from a device such as the rear-view mirror assembly are received in tubular openings 105a, b, c, respectively defined by tubes 106a, b and c.

Stiffening struts 204, 206 and 208 provide rigidity to structure 100 by coupling the mounting tubes and the wire harness closeout 104 as shown in FIG. 2.

FIGS. 3A, B and C set forth the method of installation of support structure 100 to an interior surface of door outer panel 302. As seen from FIG. 3A, door outer panel 302 includes a locator/installing assembly receiving cavity 310 which will receive the locating and installing assembly 110 of structural element 100. Door outer panel 302 also includes a tab 312 for abutting receipt of flexible tab 112. Aperture 314 in door outer panel 302 is positioned for mating receipt of locating protrusion pin 114 carried by flexible member 112. Slots 316 and 318 in door outer panel 302 are positioned for receipt of respective tangs 116 and 118 of the locating and installing assembly 110 of the reinforcement structure 100. Finally, openings 305a, b, c in outer panel 302 are aligned respectively with openings 105a, b, c in reinforcement structure 100.

Figure 3B:
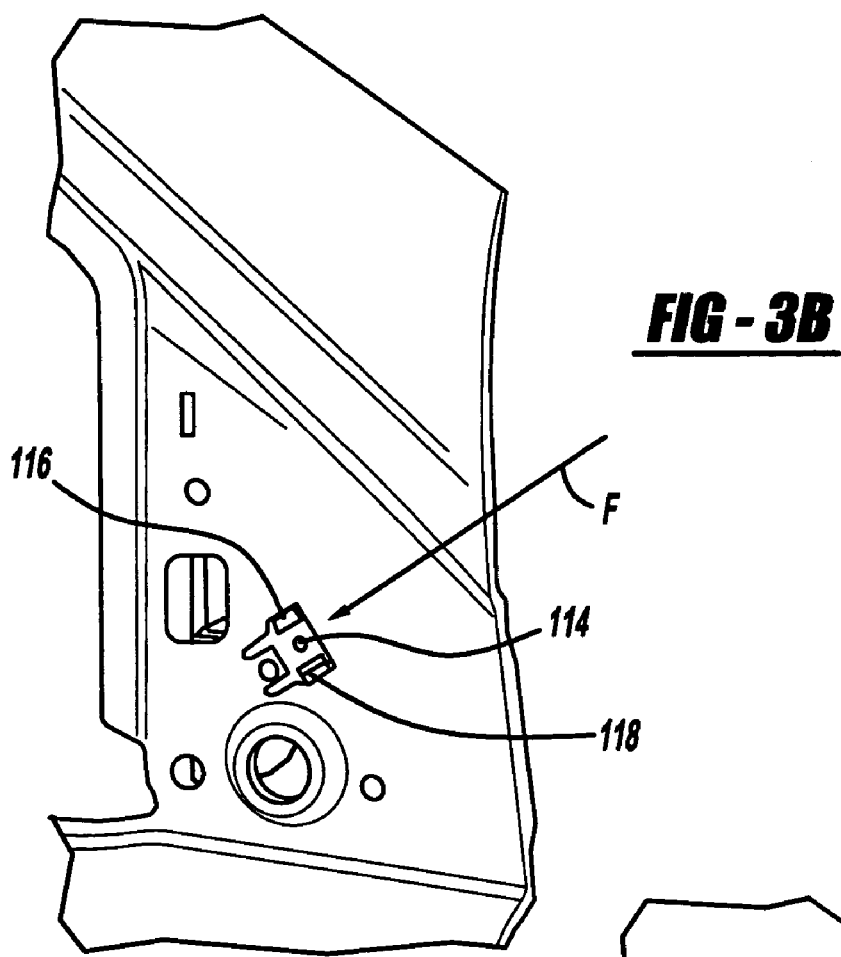
Figure 3C:
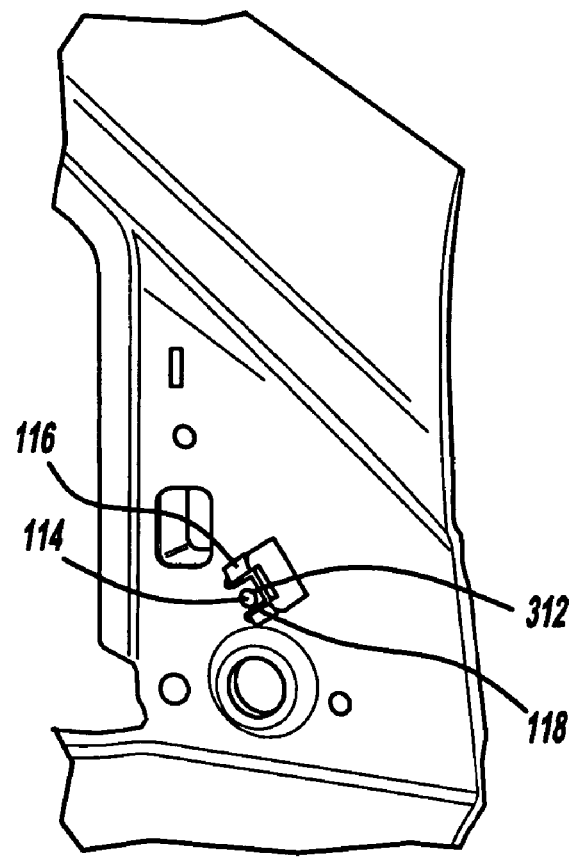

In FIG. 3B, after locating and installing assembly 110 has been placed in opening 310 of door panel 302, the structure 100 is then pushed in a direction marked F in FIG. 3B downwardly such that flexible tab 112 rides up over tab 312 in door panel 302 until its protrusion 114 snaps into place in cavity 314 of panel 302 thereby mechanically attaching structure 100 to panel 302 in the proper orientation, all without the necessity of a welding process or positioning tools.

Figure 4:
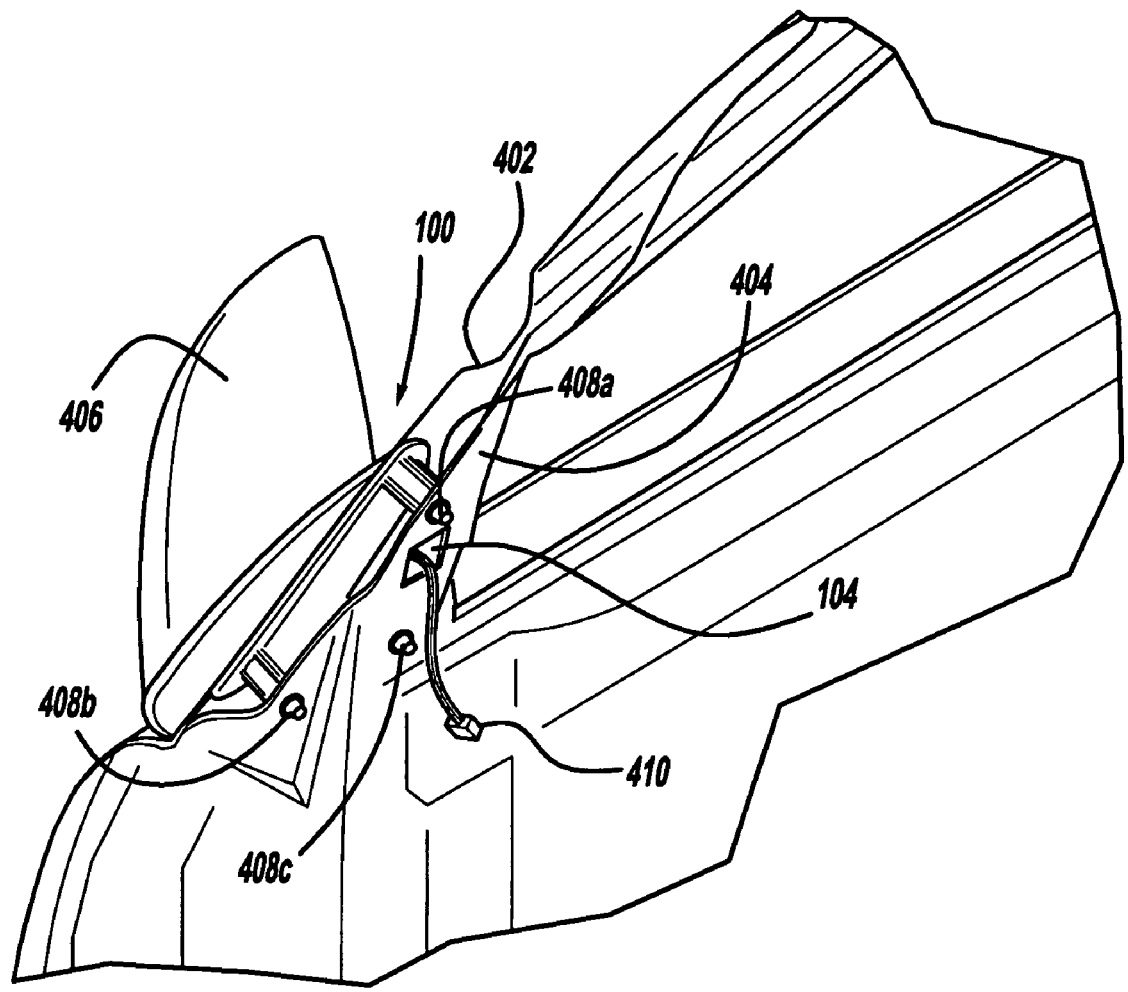
FIG. 4 is a perspective view showing the reinforcement structure of the invention installed between the inner and outer door panels of a door assembly.

With reference to FIG. 4, reinforcement structure 100 is depicted installed between door outer panel 402 and door inner panel 404. Mirror housing 406 has three mounting studs 408a, b, c which extend through the mounting columns of structure 100 from the mirror housing 406 through the columns and then through mating apertures in the cabin-facing surface of door inner panel 404. Additionally, a wiring harness or bundle 410 is seen coming from mirror assembly 406 through the wiring bundle closeout 104 of FIGS. 1 or 2 to a mating aperture in the cabin-facing surface of door inner panel 404. Each stud 408a, b, c threaded at its end for receipt of mounting nuts. In this manner, the wiring harness is isolated from the interior space intermediate door inner and outer panels 402 and 404 and is less subject to vibration and attendant noise.

The invention has been described with reference to an exemplary detailed description. The scope and spirit of the invention are to be determined from appropriately interpreted appended claims.

What is claimed is:

1. A load-bearing reinforcement structure for a vehicular door, the structure comprising:
   a plate-like element having a first face adapted to at least partially abut an inner surface of one of the vehicle door's inner and outer panels;
   a plurality of hollow tubular members extending from the plate-like element toward the inner and outer panels of the vehicle door for a distance substantially equal to a distance between the inner and outer panels of the vehicle door; and
   a locating and attachment assembly adapted to attachingly engage one of the vehicle door's inner and outer panels in a preselected orientation with respect thereto.

2. The reinforcement structure of claim 1 further comprising:
   a hollow conduit extending from the first face for a distance substantially equal to the distance between the inner and outer panels of the vehicle door.

3. The reinforcement structure of claim 1 wherein the plate-like element, the plurality of hollow tubular members and the locating and attachment assembly are integrally molded from plastic.

4. The reinforcement structure of claim 3 wherein the plastic comprises Polyethylene Terephthalate.

5. The reinforcement structure of claim 3 wherein the plastic comprises glass-reinforced Polyethylene Terephthalate.

6. The reinforcement structure of claim 3 wherein the plastic comprises 35–40% mica/glass-reinforced Polyethylene Terephthalate.

7. The reinforcement structure of claim 2 wherein the plate-like element, the plurality of hollow tubular members, the locating and attachment assembly and the hollow conduit are integrally molded from plastic.

8. The reinforcement structure of claim 1 wherein the hollow tubular members are adapted to receive a mounting stud therethrough, the mounting stud coupled to a loading element.

9. The reinforcement structure of claim 8 wherein the loading element comprises a rear-view mirror assembly.

10. The reinforcement structure of claim 1 further comprising a locating slot opening at a boundary of the plate-like element.

11. The reinforcement structure of claim 1 wherein the locating and attachment assembly further comprises a flexible tab carrying a protrusion adapted to snap into a mating cavity formed in the one of the door's inner and outer panels, thereby mechanically coupling the structure to the one of the panels without need for welding or use of separate mechanical coupling elements.

12. A vehicle including a door assembly having inner and outer door panels separated by an interior gap; and
   an injection molded plastic reinforcement structure for the door assembly comprising:
   a plate-like element having a first face at least partially engaging an inner surface of the outer door panels;
   a plurality of hollow tubular members extending from the plate-like element across the gap to a corresponding plurality of openings in the inner door panel;
   a locating and attaching assembly associated with the first face attachingly engaging the outer door panel in a preselected orientation with respect thereto;
   a hollow conduit extending from the first face across the gap to an inside surface of the inner door panel and in communication with substantially mating openings in the outer and inner door panels; and
   a loading element coupled to an outer surface of the outer door panel by a plurality of studs, each extending from the loading element through the outer door panel, through one of the plurality of hollow tubular members and then through a corresponding opening in the inner door panel.

13. The vehicle of claim 12 wherein the loading element comprises a rear-view mirror assembly.

14. The vehicle of claim 12 wherein the plastic comprises glass-reinforced Polyethylene Terephthalate.

15. The vehicle of claim 12 where ends of the studs protruding through corresponding openings in the inner door panel are threaded for receipt of mounting nuts.

16. The vehicle of claim 12 wherein the locating and attaching assembly comprises a flexible tab carrying a protrusion which snap fits into a mating cavity in the inner surface of the outer door panel.

* * * * *